US010180362B2

(12) United States Patent
Alon et al.

(10) Patent No.: US 10,180,362 B2
(45) Date of Patent: Jan. 15, 2019

(54) SYSTEM, METHOD AND COMPUTER-ACCESSIBLE MEDIUM FOR DETERMINING SPECIFIC ABSORPTION RATE OBTAINED BASED ON MAGNETIC RESONANCE IMAGING AND TEMPERATURE PROPERTY MEASUREMENTS

(71) Applicant: NEW YORK UNIVERSITY, New York, NY (US)

(72) Inventors: Leeor Alon, New York, NY (US); Cem Murat Deniz, Long Island City, NY (US); Gene Young Cho, New York, NY (US); Leslie F. Greengard, New York, NY (US)

(73) Assignee: New York University, New York, NY (US)

( * ) Notice: Subject to any disclaimer, the term of this patent is extended or adjusted under 35 U.S.C. 154(b) by 1113 days.

(21) Appl. No.: 14/272,919

(22) Filed: May 8, 2014

(65) Prior Publication Data

US 2014/0334518 A1 Nov. 13, 2014

Related U.S. Application Data

(60) Provisional application No. 61/821,087, filed on May 8, 2013.

(51) Int. Cl.
 *G01K 11/00* (2006.01)
(52) U.S. Cl.
 CPC .................. *G01K 11/006* (2013.01)

(58) Field of Classification Search
 CPC .................................................... G01K 11/006
 See application file for complete search history.

(56) References Cited

U.S. PATENT DOCUMENTS

| | | | | |
|---|---|---|---|---|
| 5,916,161 A * | 6/1999 | Ishihara | ................. | A61B 5/015 324/315 |
| 8,854,042 B2 * | 10/2014 | Vaughan, Jr. | ...... | G01R 33/3415 324/318 |
| 9,241,762 B2 * | 1/2016 | Podhajsky | ............. | A61B 18/14 |
| 9,468,492 B2 * | 10/2016 | Podhajsky | ............. | A61B 5/015 |
| 9,482,728 B2 * | 11/2016 | Bottomley | ........... | G01R 33/285 |

OTHER PUBLICATIONS

T. Schmid, et al., "Automated E-field scanning system for dosimetric assessments", IEEE Trans. Microwave Theory and Techniques, vol. 44, pp. 105-113, 1996.
Y. Okano, et al., "A Specific Absorption Rate Measurement Method Using Fiber Optic Thermal Sensors" IEEE Trans. Instrum. Meas, vol. 59, pp. 1705-1714, Jun. 2010.

(Continued)

*Primary Examiner* — Dixomara Vargas
(74) *Attorney, Agent, or Firm* — Hunton Andrews Kurth LLP (57) ABSTRACT

Systems, methods and computer-accessible mediums for determining a specific absorption rate (SAR) of a radio frequency (RF) radiation on an object(s) can be provided, which can, for example hardware arrangement configured to receive thermal information for a portion(s) of the at least one object, and determine the SAR based on the thermal information.

24 Claims, 4 Drawing Sheets

(56) References Cited

OTHER PUBLICATIONS

C.M. Deniz, et al., "A Novel Method for Experimental Assessment of Antenna Safety Using MR Thermometry" ISMRM, 2013, p. 4424.
L. Alon, et al., "Mobile Phone RF Safety Testing using Magnetic Resonance Imaging" ISMRM, 2013, p. 3593.
L. Yan, et al., "A computational method for identifying a spacewise-dependent heat source" Int'l J for Numerical Methods in Biomedical Engineering, vol. 26, 2010, pp. 597-608.
Kirane et al., "Determination of an unknown source . . . linear heat equation involving fractional derivative in time", Applied Math and Comp., vol. 218, 2011, pp. 163-170.
E. J. Candes et al., "Near Optimal Signal Recovery From Random Projections: Universal Encoding Strategies?", IEEE Transactions on Info Theory, vol. 52, 2006, pp. 5406-5425.
J. Juutilainen et al., "Biological effects of amplitude-modulated radiofrequency radiation" Scand J Work Environ Health, vol. 24, pp. 245-254, Aug. 1998.
ICNIRP, Statement on the "Guidelines for Limiting . . . Magnetic, & Electromagnetic Fields (Up to 300 Ghz)" Health Phys, vol. 97, Aug. 12, 2009 ed, 2009, pp. 257-258.
V. Rieke et al., "MR Thermometry" J Magn Reson Imaging, vol. 27, pp. 376-390, Feb. 2008.
C. M. Collins et al., "Temperature & SAR Calculations for a Human Head within Volume & Surface Coils at 64 & 300MHz" J Magn Reson Imaging, vol. 19, pp. 650-656, May 2004.
Feynman, L. et al., "The Feynman Lectures on Physics," vol. 3, pp. 1-327, 1964.
"Council Recommendation" Official Journal of the European Communities, vol. 1999, pp. 59-70, Jul. 30, 1999.

* cited by examiner

SYSTEM, METHOD AND COMPUTER-ACCESSIBLE MEDIUM FOR DETERMINING SPECIFIC ABSORPTION RATE OBTAINED BASED ON MAGNETIC RESONANCE IMAGING AND TEMPERATURE PROPERTY MEASUREMENTS

CROSS-REFERENCE TO RELATED APPLICATIONS

This application relates to and claims priority from U.S. Patent Application No. 61/821,087, filed on May 8, 2013, the entire disclosure of which is incorporated herein by reference.

FIELD OF THE DISCLOSURE

The present disclosure relates generally to a determination of a specific absorption rate ("SAR") of the effect of radio frequency ("RF") radiation on an object, and more specifically, to exemplary embodiments of systems, methods and computer-accessible mediums for calculating or otherwise determining the SAR of the object using volumetric temperature measurements.

BACKGROUND INFORMATION

Exposure to the RF radiation can result in an increased heating of tissue via Joule and Dielectric heating mechanisms. (See, e.g., Reference 1). In order to prevent the deposition of excessive RF energy into the body, the maximum allowed temperature increase during RF heating can be regulated (see, e.g., References 2 and 3) by measuring the SAR, the rate at which energy can be deposited inside the body. SAR has been previously measured in the wireless industry using electric ("E") field probes (see, e.g., Reference 4) that can be mechanically moved in a point-by-point, grid-like, fashion in three-dimensional ("3D") space inside a phantom filled with a liquid mimicking the electrical properties of human tissues. Such a measurement technique, however, can suffer from translational delays and translational errors in measurements due to the point-by-point movement of the field probe. Recently, several studies have shown the feasibility of assessing the RF safety via temperature measurements using temperature probes (see, e.g., Reference 5) and magnetic resonance ("MR") temperature mapping. (See, e.g., References 6 and 7). In temperature-based procedures, a heating duration can play an important role in estimating the SAR. Maintaining the duration of heating low can benefit from sufficient device output RF power in order to minimize the heat diffusion, while also being able to accurately measure a temperature change. Temperature-based RF safety assessment of low power RF emitting devices may need the heating duration to be sufficiently long in order to get detectable temperature change within the phantom.

Thus, it may be beneficial to provide exemplary systems, methods and computer-accessible medium for calculation of the SAR of an object, which can utilize heat diffusion and perfusion, which can invert the heat equation to estimate a local SAR distribution, and which can overcome at least some of the problems presented herein above.

SUMMARY OF EXEMPLARY EMBODIMENTS

Systems, methods and computer-accessible mediums for determining a specific absorption rate (SAR) of a radio frequency (RF) radiation on an object(s) can be provided, which can include, for example, a hardware arrangement configured to receive thermal information in space and time for a portion(s) of the object(s) based on the RF radiation, and determine the SAR based on the thermal. The thermal information can include thermal properties of the object(s), which can be determined using further information received from a thermal property analyzer. The thermal information can also include a temperature difference map(s) of the object(s), which can be generated based on further information received from a magnetic resonance imaging apparatus. Noise can be injected into the temperature difference map(s). The thermal information can also include both thermal properties of the portion(s) and a temperature difference map(s) of the portion(s).

In some exemplary embodiments of the present disclosure, an unaveraged local SAR based can be determined based on the thermal information, and the determination of the SAR can be based on the unaveraged local SAR. The SAR can include a spatial average SAR, which can be about a 1 g or a 10 g SAR. The SAR can be determined using a bioheat equation based on the thermal information, which can be a finite difference bioheat equation. The bioheat equation can be modeled as a linear polynomial equation, and can be a parabolic partial differential equation. The SAR can be determined based on an inversion of the bioheat equation, which can be based on an L1 weighted norm minimization.

In certain exemplary embodiments of the present disclosure, the bioheat equation can be $T_N=(1+L)^{N-1}T_1+\Sigma_{i=0}^{N-2}(1+L)^i f$, where $T_N$ can be a final temperature of the at least one object, L can be a linear operator (e.g., a Laplace operator), N can be the number of time points, $T_1$ can be an initial temperature of the at least one object, and f can be a source term defined as $f=\Delta t \times SAR \times C^{-1}$, where $\Delta t$ can be a time change in one interval and C can be a heat capacity. In some exemplary embodiments of the present disclosure, the RF radiation can be generated using a dipole antenna arrangement.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures.

DETAILED DESCRIPTION OF EXEMPLARY EMBODIMENTS

Exemplary MR temperature mapping can be used to measure small temperature changes, with a resolution of a few millimeters, to invert a heat equation, and to determine and/or calculate a local SAR distribution. By combining the exemplary information provided by the exemplary MR temperature mapping with physical thermal measurements of the phantom (e.g., using an exemplary thermal property analyzer), an inversion of the heat equation can provide the local SAR distribution. Exemplary results can be shown using Electromagnetic ("EM") field simulations, where the true simulated SAR, which may not be known in the exemplary experiments, can be obtained from a temperature with realistic noise addition, as well as using MR based temperature measurement experiments.

Exemplary Theory

The heat equation with source term can be a parabolic partial differential equation, which can capture the behavior of a temperature in space and time when a body can be exposed to an external energy source. The exemplary equation in non-perfused, homogeneous, media can be expressed, for example, as follows:

$$\rho C \frac{\partial T}{\partial t} = \nabla \cdot (k \nabla T) + SAR \rho \quad (1)$$

(see, e.g., Reference 9) where $\rho$, $C$, $k$, and SAR can be the tissue density (e.g., in kilograms per cubic meter), heat capacity (e.g., in Joules per kilogram per degree Celsius), thermal conductivity (e.g. in Watts ("W") per meter per degree Celsius), and SAR (e.g., in Watts per kilogram), respectively.

The SAR, for example, which can be the driving force for temperature rise as result of Joule/Dielectric heating mechanisms, can be defined, for example, as follows:

$$SAR = \frac{\sigma |E|^2}{\rho} \quad (2)$$

where E can be the induced electric field (e.g. in Volts per meter) inside the body, and $\sigma$ can be the electrical conductivity (e.g. in siemens per meter).

If the heating time (e.g., due to an external RF source) can be short, and thermal diffusion can be negligible, Eq. (1) can be integrated in time and simplified, for example, as follows:

$$SAR = C \frac{\Delta T}{\Delta t} \quad (3)$$

where the temperature change (e.g., in degrees Celsius) can be induced during a time-interval (e.g. in seconds). When heating can occur over a sufficiently long period, heat diffusion may be able to be ignored using Eq. (3), which can result in high errors, and the SAR can be determined by inversion of the heat equation.

There can be several exemplary procedures available to extract the source term in parabolic partial differential equations. (See, e.g., References 10 and 11). For example, a finite difference approximation to the heat equation can be utilized through the following linear polynomial equation, which can be, for example:

$$T_N = (1+L)^{N-1} T_1 + \Sigma_{i=0}^{N-2} (1+L)^i f \quad (4)$$

(see, e.g., Reference 10), where f can be the source term defined as: $f = \Delta t \times SAR \times C^{-1}$, $T_1$ and $T_N$ can be the initial and final temperature of the sample, respectively, N can be the number of exemplary time points, and L can be a linear Laplace operator defined as: $L = \Delta t * k * \nabla^2$. Since all the terms in Eq. (4), except f, can be measurable quantities (e.g. k and C can be measured using a thermal probe, and $\Delta T = T_N - T_1$ using MR), Eq. (4) can be written as a linear matrix equation, and f can be determined and/or calculated using any suitable minimization cost procedure. For example, f can be determined and/or calculated using the following exemplary L1 norm weighted least squares minimization, which can be robust with respect to noise for sparse representations:

$$\arg\min_f \{ \|Af - b\|_2 + \lambda \|f\|_1 \} \quad (5)$$

(see, e.g., Reference 12) where $b = T_N - (1+L)^{N-1} T_1$, $A = \Sigma_{i=0}^{N-2} (1+L)^i$, and $\lambda$ can be a regularization parameter that can be empirically set to about 1.5.

Exemplary Methods

Figure 1A:
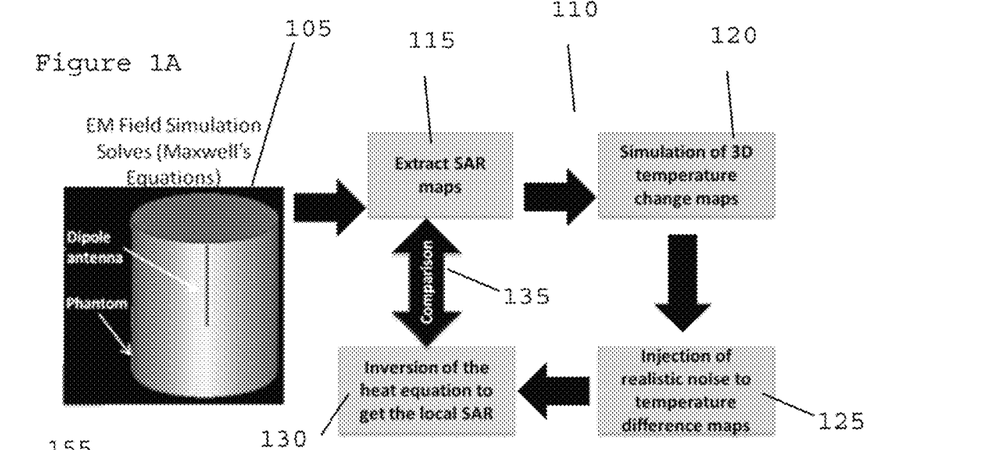
FIG. 1A is an exemplary diagram illustrating an exemplary phantom-dipole antenna setup and an exemplary flow diagram of an exemplary procedure used in an inverse heat problem, according to an exemplary embodiment of the present disclosure.

FIG. 1A shows an exemplary diagram of an exemplary phantom dipole arrangement 105 and an associated flow diagram 110 of an exemplary procedure used for determining/calculating a solution of an exemplary inverse heat problem. The exemplary phantom dimension of the exemplary phantom dipole antenna arrangement 105 can be about 10.2 cm in diameter, and about 11 cm in height. At procedure 115, exemplary SAR maps of the phantom can be extracted.

At procedure 120, 3D temperature change maps can be simulated. At procedure 125, realistic noise can be injected into the temperature difference maps. At procedure 130, the heat equation can be inverted to obtain the local SAR, and a comparison can be performed with the extracted SAR maps at procedure 135. EM field simulations can be performed on the exemplary dipole antenna phantom setup shown in FIG. 1A, in order to obtain the SAR distribution induced by the dipole antenna inside the phantom, and in order to validate the heat equation inversion problem. Commercial Microwave Studio software (e.g., CST, Framingham, Mass., USA) using finite integration technique ("FIT") can be used for the exemplary simulations.

The parameters used in the exemplary FIT calculations can be as follows: about 2.7 mm isotropic cell size, mesh dimensions about 84×83×83, feeding with a voltage source operating at about 1.96 GHz. An about 5 mm separation between the phantom and the dipole antenna can be used to simulate the physical setup in the scanner room. The net input power used can be about 0.65 W. The simulated SAR distribution can be used along with the thermal properties of the phantom to model the temperature distribution in the phantom numerically by solving the heat equation (e.g. Eq. (1)) as result of about 6.5 minutes of heating. (See, e.g., Reference 13). Gaussian noise, similar in mean and standard deviation to the MR temperature maps, with standard deviation of about 0.1° C., can be added to the simulated temperature maps. The inversion of the heat equation can then be conducted using L1 weighted norm minimization (e.g. Eq. (5)) in order to estimate the unaveraged local SAR. The average SAR (e.g., a 10 g SAR), which can be regulated for RF safety by the international standard committees (see, e.g., Reference 3), can be determined/calculated from the unaveraged local SAR, and compared with the original, (e.g., "true") average SAR distribution that can be computed in simulation. The mean, standard deviation and max error between the true and reconstructed average SAR can be determined/calculated to assess the accuracy of the inverse heat equation solution.

Figures 1B, 1C:
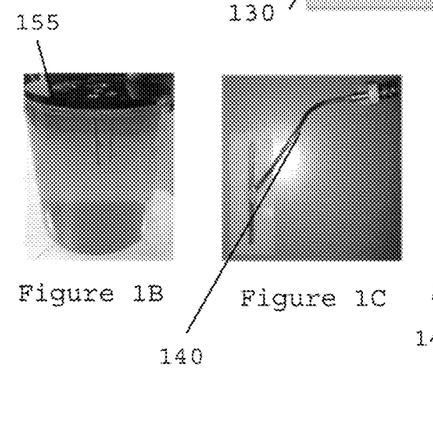
FIG. 1B is an exemplary image of an exemplary gel phantom used in exemplary magnetic resonance temperature mapping experiments according to an exemplary embodiment of the present disclosure.
FIG. 1C is an exemplary image of an exemplary dipole antenna arrangement used in the exemplary magnetic resonance experiments according to an exemplary embodiment of the present disclosure.
Figure 1D:
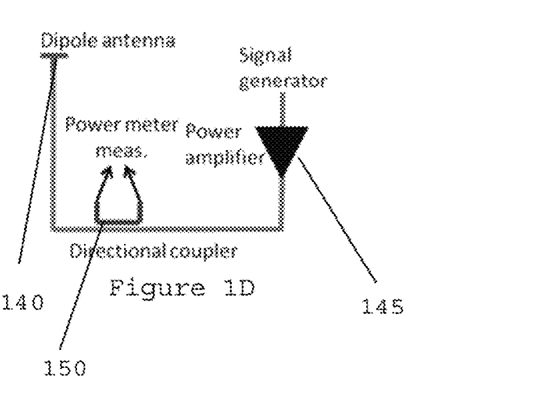
FIG. 1D is an exemplary schematic diagram illustrating an exemplary experiment setup used to drive the exemplary dipole antenna of FIG. 1C while measuring the net output power, according to an exemplary embodiment of the present disclosure.

For the exemplary experiments, a half wavelength (e.g. $\lambda/2$) dipole antenna (See, e.g., FIG. 1C) can be provided to operate at about 1.96 GHz and can be matched for maximum efficiency with S11<−15 dB. Exemplary phantom properties of an exemplary phantom (e.g., phantom 155 of FIG. 1B) can be, for example, $\rho$=1272 (kg/m$^3$), C=3543 (J/kg·° C.) and k=0.457 (W/m·° C.). An exemplary diagram of the experimental setup used to drive an exemplary antenna 140 (see, e.g. antenna 140 of FIG. 1C) is shown in FIG. 1D. For example, during the RF heating period, the antenna 140 can be operated in q continuous wave mode for about 6.5 minutes, and net injected RF power can be monitored using a directional coupler 145 (e.g., Agilent Technologies 778D) and a power sensor 150 (e.g., NRP-Z11, Rhode & Schwarz). The RF heating can be detected using, for example, a 3 Tesla ("T") MR scanner and head and neck coil (e.g. Siemens Medical Solutions, Erlangen, Germany) with about 20 receive elements. Multi-slice, interleaved, spoiled gradient-echo ("GRE") images of the phantom, before and after RF heating, can be acquired with the following parameters: repetition time ("TR")=about 244 ms, echo time ("TE")=about 17 ms, voxel dimension=about 2.7 mm×2.7 mm×5 mm, number of slices=about 11 and total acquisition time=about 31 s. Alternatively or in addition, a referenceless MRI procedure can be used, and only images may only need to be acquired after RF heating. The fundamental phenomenon governing most MR-based temperature mapping can be the Proton Resonance Frequency ("PRF") shift, which can linearly relate the precession frequency of the spins of protons with temperature (see, e.g., Reference 8), enabling RF power deposition assessment via temperature measurements. The PRF shift can be used to convert multi-coil GRE phase measurements into a temperature difference map. The temperature difference map and the thermal properties of the phantom, measured using an exemplary thermal property analyzer (e.g., KD2 Pro, Pullman, Wash., USA), can be used to invert the heat equation, and determine/compute the unaveraged local SAR, which can facilitate the calculation/determination of the average SAR.

Exemplary Results and Conclusions

Figure 2A:
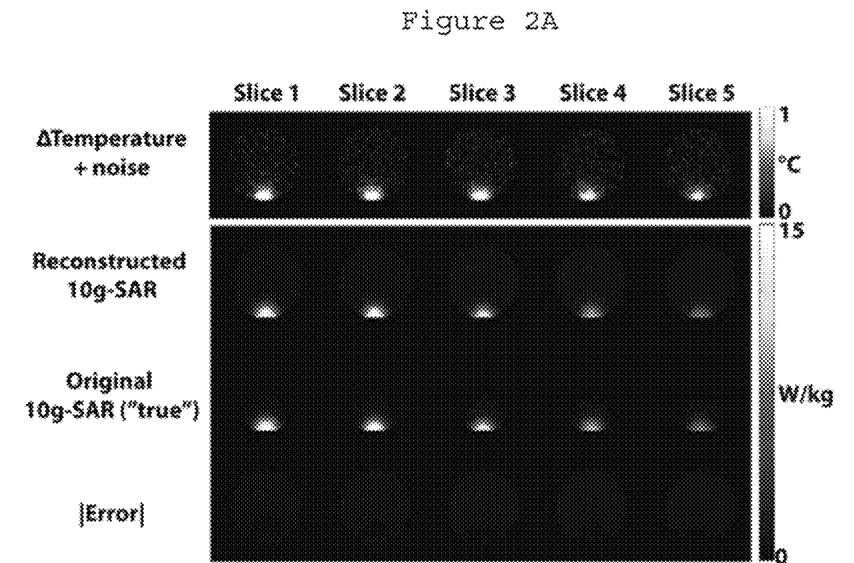
FIG. 2A is a set of exemplary absorption rate maps illustrating a simulated temperature change and 10 g spatial average SAR at 5 slices inside an exemplary phantom according to an exemplary embodiment of the present disclosure.
Figure 2B:
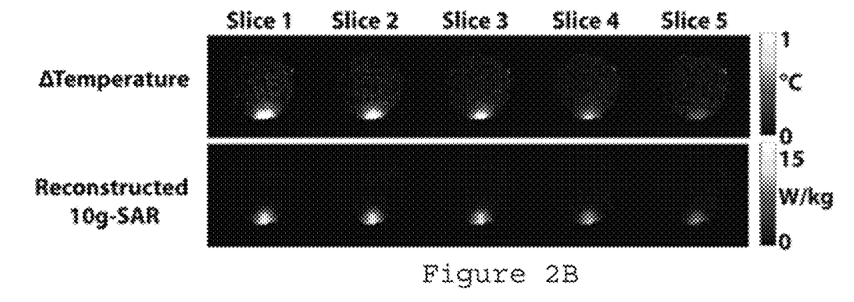
FIG. 2B is a set of exemplary experimentally measured temperature change maps and exemplary reconstructed 10 g average specific absorption rate maps at 5 slices inside an exemplary phantom, according to an exemplary embodiment of the present disclosure.

FIG. 2A shows a set of exemplary absorption rate maps providing an exemplary EM field simulation comparison between the reconstructed and "true" average SAR results for five slices in the middle of the phantom. For example, as shown in FIG. 2A, the mean, standard deviation and maximum error between the reconstructed and "true" average SAR distributions over the entire volume of the phantom can be, for example, 0.1 W/kg, 0.14 W/kg and 1.42 W/kg, respectively. Exemplary simulation results can illustrate that the average SAR can be reconstructed within 8.8% of maximum value using a finite difference approximation solution to an inverse heat diffusion problem. The exemplary error reported can be due to noise propagation in the inversion process, and other reconstruction methods for minimizing the error propagation can be used. Exemplary experimental average SAR results are shown in FIG. 2B, where temperature maps of RF heating from an exemplary dipole antenna positioned inside the MR scanner room can be used in solving the inverse heat problem.

Figure 3:
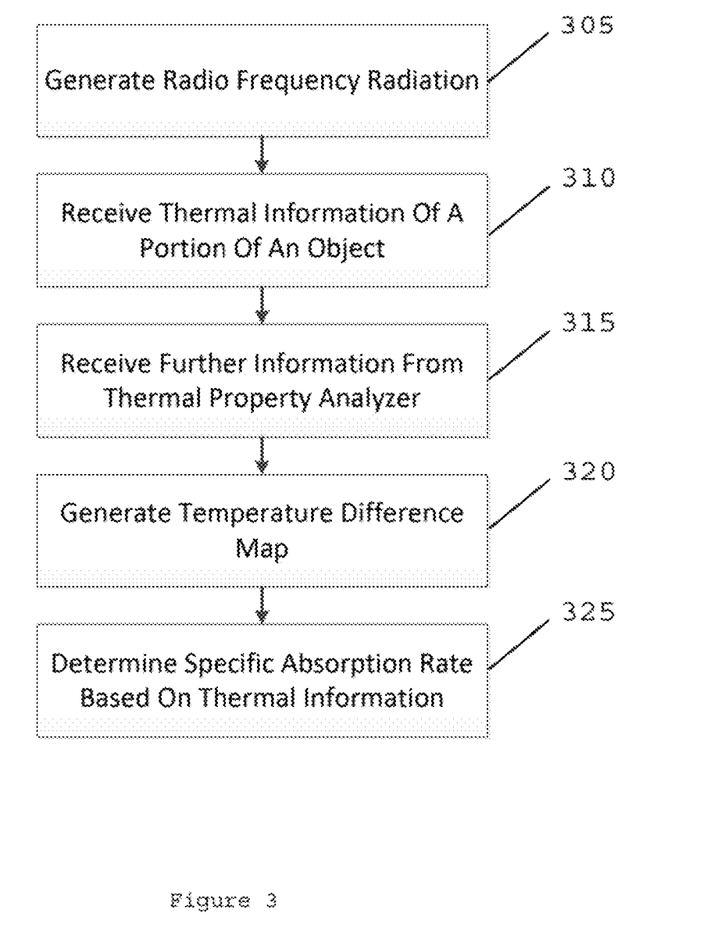
FIG. 3 is an exemplary flow chart illustrating an exemplary method for determining the specific absorption rate of an object according to an exemplary embodiment of the present disclosure.

FIG. 3 is an exemplary flow chart illustrating an exemplary method for generating the SAR of an object. For example, at procedure 305, RF radiation can be generated and applied to an object. At procedure 310, thermal information about a portion of the object can be received that can be based on the RF radiation. At procedure 315, further information from a thermal property analyzer can be received, and a temperature difference map can be generated at procedure 320. At procedure 325 the SAR of the objected can be determined.

Figure 4:
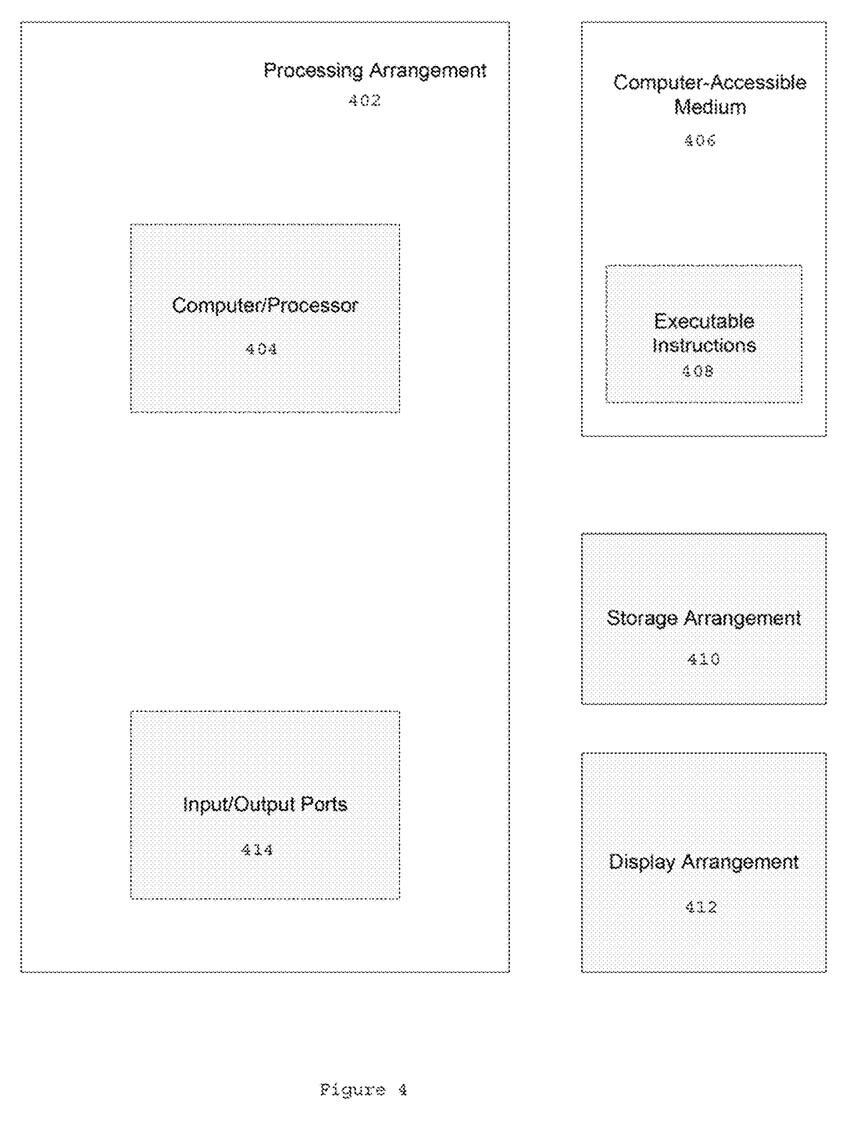
FIG. 4 is an illustration of an exemplary block diagram of an exemplary system in accordance with certain exemplary embodiments of the present disclosure.

FIG. 4 shows a block diagram of an exemplary embodiment of a system according to the present disclosure. For example, exemplary procedures in accordance with the present disclosure described herein can be performed by a processing arrangement and/or a computing arrangement 402. Such processing/computing arrangement 402 can be, for example, entirely or a part of, or include, but not limited to, a computer/processor 404 that can include, for example, one or more microprocessors, and use instructions stored on a computer-accessible medium (e.g. RAM, ROM, hard drive, or other storage device).

As shown in FIG. 4, for example, a computer-accessible medium 406 (e.g. as described herein above, a storage device such as a hard disk, floppy disk, memory stick, CD-ROM, RAM, ROM, etc., or a collection thereof) can be provided (e.g. in communication with the processing arrangement 402). The computer-accessible medium 406 can contain executable instructions 408 thereon. In addition or alternatively, a storage arrangement 410 can be provided separately from the computer-accessible medium 406, which can provide the instructions to the processing arrangement 402 to configure the processing arrangement to execute certain exemplary procedures, processes and methods, as described herein above, for example.

Further, the exemplary processing arrangement 402 can be provided with or include an input/output arrangement 414, which can include, for example, a wired network, a wireless network, the internet, an intranet, a data collection probe, a sensor, etc. As shown in FIG. 4, the exemplary processing arrangement 402 can be in communication with an exemplary display arrangement 412, which, according to certain exemplary embodiments of the present disclosure, can be a touch-screen configured for inputting information to the processing arrangement in addition to outputting information from the processing arrangement, for example. Further, the exemplary display 412 and/or a storage arrangement 410 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties.
[1] J. Juutilainen et al., *Scand J Work Environ Health*, vol. 24, pp. 245-54, August 1998
[2] COTEU, *J Eur Communities*, vol. 199, pp. 59-70, 1999
[3] ICNIRP, *Health Phys*, vol. 97, 2009 Aug. 12 ed, 2009, pp. 257-8.
[4] T. Schmid, et al., *IEEE Trans. Microwave Theory and Techniques*, vol. 44, pp. 105-113, 1996.
[5] Y. Okano, et al., *IEEE Trans. Instrum. Meas*, vol. 59, pp. 1705-14, June 2010
[6] C. M. Deniz, et al., *ISMRM*, 2013, p. 4424
[7] L. Alon, et al., *ISMRM*, 2013, p. 3593
[8] V. Rieke et al., *J Magn Reson Imaging*, vol. 27, pp. 376-90, February 2008
[9] L. Feynman. R. et al., *The Feynman Lectures on Physics*, vol. 3, 1964
[10] L. Yan, et al., *International Journal for Numerical Methods in Biomedical Engineering*, vol. 26, pp. 597-608, 2010
[11] M. Kirane et al., *Applied Mathematics and Computation*, vol. 218, pp. 163-170, 2011
[12] E. J. Candes et al., *IEEE Transactions on Information Theory*, vol. 52, pp. 5406-5425, December 2006
[13] C. M. Collins et al., *J Magn Reson Imaging*, vol. 19, pp. 650-6, May 2004

What is claimed is:

1. A system for determining a specific absorption rate (SAR) of a radio frequency (RF) radiation on at least one object, comprising:
   a computer hardware arrangement configured to:
      receive, from a magnetic resonance apparatus, thermal information in space and time for at least one portion of the at least one object based on the RF radiation;
      obtain an inverted bioheat equation that is based on the thermal information;
      determine the SAR using the inverted bioheat equation; and at least one of (i) display the SAR to a user, or store the SAR in a storage arrangement.

2. The system of claim 1, wherein the thermal information includes thermal properties of the at least one object.

3. The system of claim 2, wherein the computer hardware arrangement is further configured to determine the thermal properties using further information received from a thermal property analyzer.

4. The system of claim 1, wherein the thermal information includes at least one temperature difference map of the at least one object.

5. The system of claim 4, wherein the computer hardware arrangement is further configured to inject noise into the at least one temperature difference map.

6. The system of claim 4, wherein the computer hardware arrangement is further configured to generate the at least one temperature difference map based on further information received from a magnetic resonance imaging apparatus.

7. The system of claim 1, wherein the thermal information includes thermal properties of the at least one portion and at least one temperature difference map of the at least one portion.

8. The system of claim 1, wherein the computer hardware arrangement is further configured to determine an unaveraged local SAR based on the thermal information, and wherein the determination of the SAR is based on the unaveraged local SAR.

9. The system of claim 8, wherein the average SAR includes a 10 g SAR.

10. The system of claim 1, wherein the SAR includes an average SAR.

11. The system of claim 1, wherein the inverted bioheat equation is a finite difference bioheat equation.

12. The system of claim 1, wherein the computer hardware arrangement is further configured to model the inverted bioheat equation as a linear polynomial equation.

13. The system of claim 1, wherein the inverted bioheat equation is a parabolic partial differential equation.

14. The system of claim 1, wherein the inverted bioheat equation is based on an L1 weighted norm minimization.

15. The system of claim 1, wherein the inverse bioheat equation is $T_N = (1+L)^{N-1} T_1 + \Sigma_{i=0}^{N-2} (1+L)^i f$, where $T_N$ is a final temperature of the at least one object, L is a linear Laplace operator, N is the number of time points, $T_1$ is an initial temperature of the at least one object, and f is a source term defined as $f = \Delta t \times SAR \times C^{-1}$, where $\Delta t$ is a time change in a single interval and C is a heat capacity.

16. The system of claim 1, wherein the computer hardware arrangement is further configured to generate the RF radiation using a dipole antenna arrangement.

17. A non-transitory computer-accessible medium having stored thereon computer-executable instructions for determining a specific absorption rate (SAR) of a radio frequency (RF) radiation on at least one object, wherein, when a computer hardware arrangement executes the instructions, the computer arrangement is configured to perform procedures comprising:
receiving, from a magnetic resonance apparatus, thermal information in space and time for at least one portion of the at least one object based on the RF radiation;
determining the SAR using an inverted bioheat equation that is based on the thermal information; and
at least one of (i) displaying the SAR to a user, or (ii) storing the SAR in a storage arrangement.

18. A method for determining a specific absorption rate (SAR) of a radio frequency (RF) radiation on at least one object, comprising:
receiving, from a magnetic resonance apparatus, thermal information in space and time for at least one portion of the at least one object based on the RF radiation;
using a computer hardware arrangement, determining the SAR using an inverted bioheat equation that is based on the thermal information; and
at least one of (i) displaying the SAR to a user, or (ii) storing the SAR in a storage arrangement.

19. A system for determining a specific absorption rate (SAR) of a radio frequency (RF) radiation on at least one object, comprising:
a computer hardware arrangement configured to:
receive, from a magnetic resonance apparatus, thermal information in space and time for at least one portion of the at least one object based on the RF radiation, wherein the thermal information includes at least one temperature difference map of the at least one object;
inject noise into the at least one temperature difference map; and
determine the SAR based on the thermal information.

20. A system for determining a specific absorption rate (SAR) of a radio frequency (RF) radiation on at least one object, comprising:
a computer hardware arrangement configured to:
receive, from a magnetic resonance apparatus, thermal information in space and time for at least one portion of the at least one object based on the RF radiation;
receive a bioheat equation that is based on the thermal information, wherein the bioheat equation is $T_N=(1+L)^{N-1}T_1+\Sigma_{i=0}^{N-2}(1+L)^i f$, where $T_N$ is a final temperature of the at least one object, L is a linear Laplace operator, N is the number of time points, $T_1$ is an initial temperature of the at least one object, and f is a source term defined as $f=\Delta t \times SAR \times C^{-1}$, where $\Delta t$ is a time change in a single interval and C is a B heat capacity; and
determine the SAR using the bioheat equation; and at least one of (i) display the SAR to a user, or store the SAR in a storage arrangement.

21. A method for determining a specific absorption rate (SAR) of a radio frequency (RF) radiation on at least one object, comprising:
receiving, from a magnetic resonance apparatus, thermal information in space and time for at least one portion of the at least one object based on the RF radiation, wherein the thermal information includes at least one temperature difference map of the at least one object;
injecting noise into the at least one temperature difference map;

using a computer hardware arrangement, determining the SAR based on the thermal information; and
at least one of (i) displaying the SAR to a user, or (ii) storing the SAR in a storage arrangement.

22. A method for determining a specific absorption rate (SAR) of a radio frequency (RF) radiation on at least one object, comprising:
receiving, from a magnetic resonance apparatus, thermal information in space and time for at least one portion of the at least one object based on the RF radiation;
receiving a bioheat equation that is based on the thermal information, wherein the bioheat equation is $T_N=(1+L)^{N-1}T_1+\Sigma_{i=0}^{N-2}(1+L)^i f$, where $T_N$ is a final temperature of the at least one object, L is a linear Laplace operator, N is the number of time points, $T_1$ is an initial temperature of the at least one object, and f is a source term defined as $f=\Delta t \times SAR \times C^{-1}$, where $\Delta t$ is a time change in a single interval and C is a heat capacity;
using a computer hardware arrangement, determining the SAR using the bioheat equation; and
at least one of (i) displaying the SAR to a user, or (ii) storing the SAR in a storage arrangement.

23. A non-transitory computer-accessible medium having stored thereon computer-executable instructions for determining a specific absorption rate (SAR) of a radio frequency (RF) radiation on at least one object, wherein, when a computer hardware arrangement executes the instructions, the computer arrangement is configured to perform procedures comprising, comprising:
receiving, from a magnetic resonance apparatus, thermal information in space and time for at least one portion of the at least one object based on the RF radiation, wherein the thermal information includes at least one temperature difference map of the at least one object;
injecting noise into the at least one temperature difference map;
determining the SAR based on the thermal information; and
at least one of (i) displaying the SAR to a user, or (ii) storing the SAR in a storage arrangement.

24. A non-transitory computer-accessible medium having stored thereon computer-executable instructions for determining a specific absorption rate (SAR) of a radio frequency (RF) radiation on at least one object, wherein, when a computer hardware arrangement executes the instructions, the computer arrangement is configured to perform procedures comprising:
receiving, from a magnetic resonance apparatus, thermal information in space and time for at least one portion of the at least one object based on the RF radiation;
receiving a bioheat equation that is based on the thermal information, wherein the bioheat equation is $T_N=(1+L)^{N-1}T_1+\Sigma_{i=0}^{N-2}(1+L)^i f$, where $T_N$ is a final temperature of the at least one object, L is a linear Laplace operator, N is the number of time points, $T_1$ is an initial temperature of the at least one object, and f is a source term defined as $f=\Delta t \times SAR \times C^{-1}$, where $\Delta t$ is a time change in a single interval and C is a heat capacity;
determining the SAR using the bioheat equation; and
at least one of (i) displaying the SAR to a user, or (ii) storing the SAR in a storage arrangement.

* * * * *